US008619296B2

(12) United States Patent
Kawamura

(10) Patent No.: US 8,619,296 B2
(45) Date of Patent: Dec. 31, 2013

(54) IMAGE FORMING APPARATUS

(75) Inventor: Takuya Kawamura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 313 days.

(21) Appl. No.: 12/945,103

(22) Filed: Nov. 12, 2010

(65) Prior Publication Data

US 2011/0157628 A1 Jun. 30, 2011

(30) Foreign Application Priority Data

Dec. 24, 2009 (JP) ................................. 2009-292669

(51) Int. Cl.
*G06F 3/12* (2006.01)
(52) U.S. Cl.
USPC .......... 358/1.15; 358/1.16; 358/1.1; 358/501; 358/401
(58) Field of Classification Search
None
See application file for complete search history.

(56) References Cited

U.S. PATENT DOCUMENTS

| | | | |
|---|---|---|---|
| 6,806,894 B2 * | 10/2004 | Seki | 347/135 |
| 7,002,713 B2 * | 2/2006 | Fukawa | 358/483 |
| 7,268,915 B2 * | 9/2007 | Fujino | 358/1.9 |
| 7,565,011 B2 * | 7/2009 | Matsunaga et al. | 382/173 |
| 2002/0054385 A1 * | 5/2002 | Fukawa | 358/505 |
| 2003/0007170 A1 * | 1/2003 | Kajita et al. | 358/1.15 |
| 2007/0070413 A1 * | 3/2007 | Someno et al. | 358/1.15 |
| 2007/0133682 A1 * | 6/2007 | Arai et al. | 375/240.16 |
| 2007/0285712 A1 * | 12/2007 | Komada | 358/1.15 |
| 2008/0013968 A1 | 1/2008 | Kawamura | |
| 2008/0044088 A1 * | 2/2008 | Nakai et al. | 382/232 |
| 2009/0190166 A1 * | 7/2009 | Nakamura et al. | 358/1.15 |

FOREIGN PATENT DOCUMENTS

| | | | |
|---|---|---|---|
| JP | 2005-104041 A | 4/2005 | |
| JP | 2005-178070 | 7/2005 | |

* cited by examiner

*Primary Examiner* — Hilina K Demeter
(74) *Attorney, Agent, or Firm* — Fitzpatrick, Cella, Harper & Scinto

(57) ABSTRACT

An image forming apparatus of the present invention includes a first circuit which creates image data on the basis of print job data, a second circuit which causes a printing unit to print an image on the basis of the image data created by the first circuit and is different from the first circuit, and a storage capable of being accessed by the first circuit and the second circuit, respectively. Additionally, when data is transferred in the first circuit and the second circuit, one circuit writes the data in the storage, and the other circuit reads out the data to transfer the data, thereby executing printing of an image.

10 Claims, 14 Drawing Sheets

IMAGE FORMING APPARATUS

BACKGROUND OF THE INVENTION

1. Field of the Invention

The present invention relates to an image forming apparatus which prints an image on the basis of print job data.

2. Description of the Related Art

In image forming apparatuses which print an image, an image forming apparatus may individually have a circuit of a main body control portion which controls the print function of the main body of the image forming apparatus, and a circuit for processing of print job data called a printer controller or a PDL controller. In addition, the PDL controller is a control portion which processes a page description language.

Also, in parallel with the processing of the main body control portion which controls the respective drive systems for allowing the image forming apparatus to perform printing, a control portion for processing print job data converts the print job data into image data capable of being processed by the main body of the image forming apparatus. Through this parallel processing, it is possible to execute at high speed the creation of image data and printing operations of the image forming apparatus.

Additionally, a storage, such as a hard disk for storing data, may be connected to the image forming apparatus. Both the main body control portion and the control portion for processing print job data are related with the data stored in this storage. For example, the control portion for processing print job data stores the print job which is received from host PC to the storage connected to the image forming apparatus. Also, when the image forming apparatus performs printing, the control portion for controlling print job data reads out a print job from the storage, creates image data on the basis of the print job, and transfers the image data to the main body control portion.

For example, a configuration in which a storage is provided on the side of a PDL controller is disclosed in Japanese Patent Application Laid-Open No. 2005-104041. However, in the above conventional technique, when image data is transferred to a main body control portion from the PDL controller, data is transferred to the main body control portion after the PDL controller performs writing and read-out of data to/from a storage. Therefore, there is a problem in that the processing load on the PDL controller may increase. Additionally, for example, even when only the main body control portion of the main body of a printer has storage, and data is transferred to a PDL controller from the main body control portion, data is similarly transferred to the PDL controller after the main body control portion performs writing and read-out of data to/from a storage. Accordingly, there is a problem in that the processing load on the main body control portion may increase.

SUMMARY OF THE INVENTION

In order to solve the above problems, an image forming apparatus of the present invention includes a printing unit which prints an image on a print medium; a receiving unit which receives print job data from an external device connected to the image forming apparatus; a first circuit which creates image data on the basis of the print job data received by the receiving unit; a second circuit which causes the printing unit to print an image on the basis of the image data created by the first circuit and is different from the first circuit; and a storage capable of being accessed by the first circuit and the second circuit, respectively. The receiving unit inputs the print job data received from the external device to the second circuit. The second circuit stores the print job data input by the receiving unit in the storage. The first circuit reads out the print job data stored in the storage from the storage, and creates image data on the basis of the read print job data.

Additionally, an image forming apparatus of the present invention includes a printing unit which prints an image on a print medium; a receiving unit which receives print job data from an external device connected to the image forming apparatus; a first circuit which creates image data on the basis of the print job data received by the receiving unit; a second circuit which causes the printing unit to print an image on the basis of the image data created by the first circuit and is different from the first circuit; and a storage capable of being accessed by the first circuit and the second circuit, respectively. The receiving unit inputs the print job data received from the external device to the first circuit. The first circuit creates image data on the basis of the print job data input by the receiving unit, and stores the created image data in the storage, and the second circuit reads out the image data stored in the storage from the storage, and causes the printing unit to print an image on the basis of the read image data.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Figure 1:
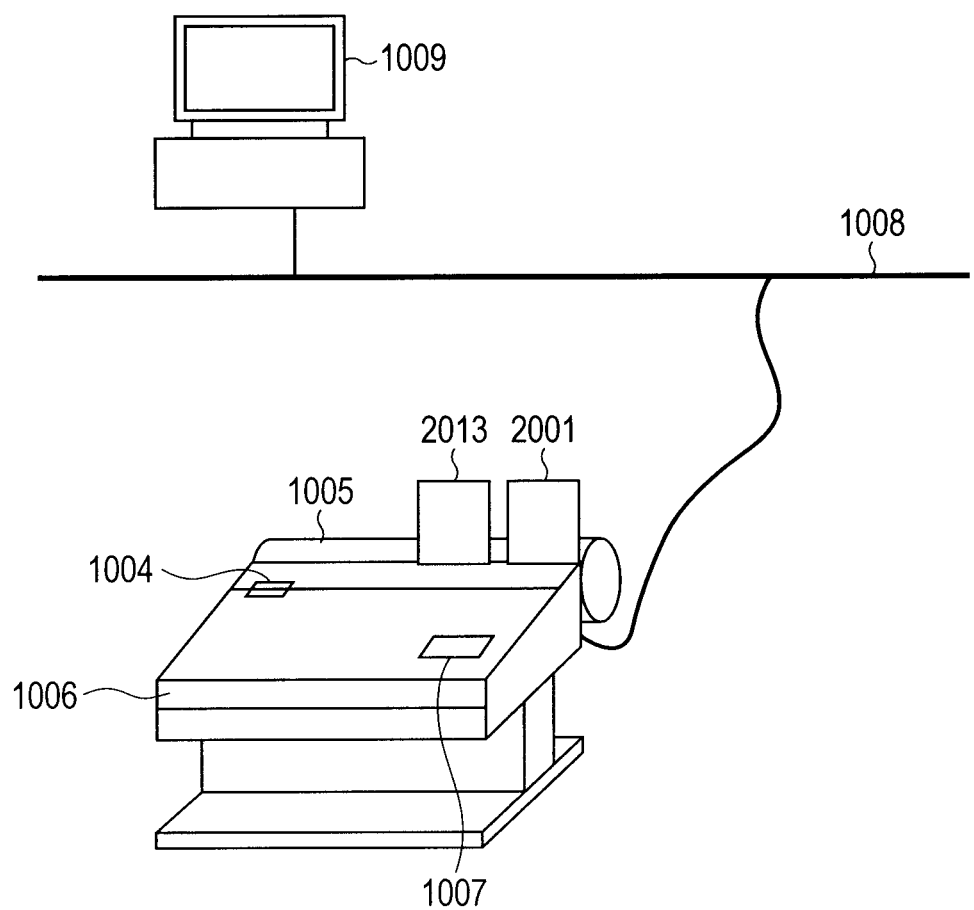
FIG. 1 is a view illustrating a system using an image forming apparatus 1.

FIG. 1 is a view illustrating the configuration of a system using an image forming apparatus 1. The image forming apparatus 1 is a large-sized ink jet printer, and has a main body control portion 2001, a printer controller 2013, an ink head 1004 for performing printing, and a rolled paper feeding unit 1005 for feeding paper to be printed.

The rolled paper to be printed by the ink head 1004 is cut by a cutter which is not illustrated, and is ejected to a paper ejection unit 1006. Additionally, a user is able to operate an operating portion 1007, thereby giving instructions for various kinds of control of the image forming apparatus 1.

Additionally, the image forming apparatus 1 is connected to a LAN network 1008 and is connected to a host PC 1009 via the LAN network 1008. In the example of FIG. 1, the host PC 1009 generates job data in a printer language of raster notation.

In addition, although the image forming apparatus 1 is an ink-jet large-sized printer, any kinds of image forming apparatuses having a plurality of control portions can be applied as the image forming apparatus irrespective of image formation types if the apparatuses are of an electrophotographic type, a thermal head type, or a sublimated type. Additionally, other than the large-sized printer, a desktop printer with cassette paper feeding or manual paper feeding, a printer having a plurality of paper feeding stages, or a multi-functional composite machine with a combined scanner or facsimile can be applied as the image forming apparatus 1. Additionally, print media on which an image is to be printed is not limited to the rolled paper, and may be so-called a cut sheet the length of which in the transport direction is determined in advance.

Additionally, although the image forming apparatus 1 has a network connection unit as an external I/F portion 2007, the image forming apparatus may have a USB, an IEEE 1394, an eS-ATA, or the like as the external I/F portion 2007.

Figure 2:
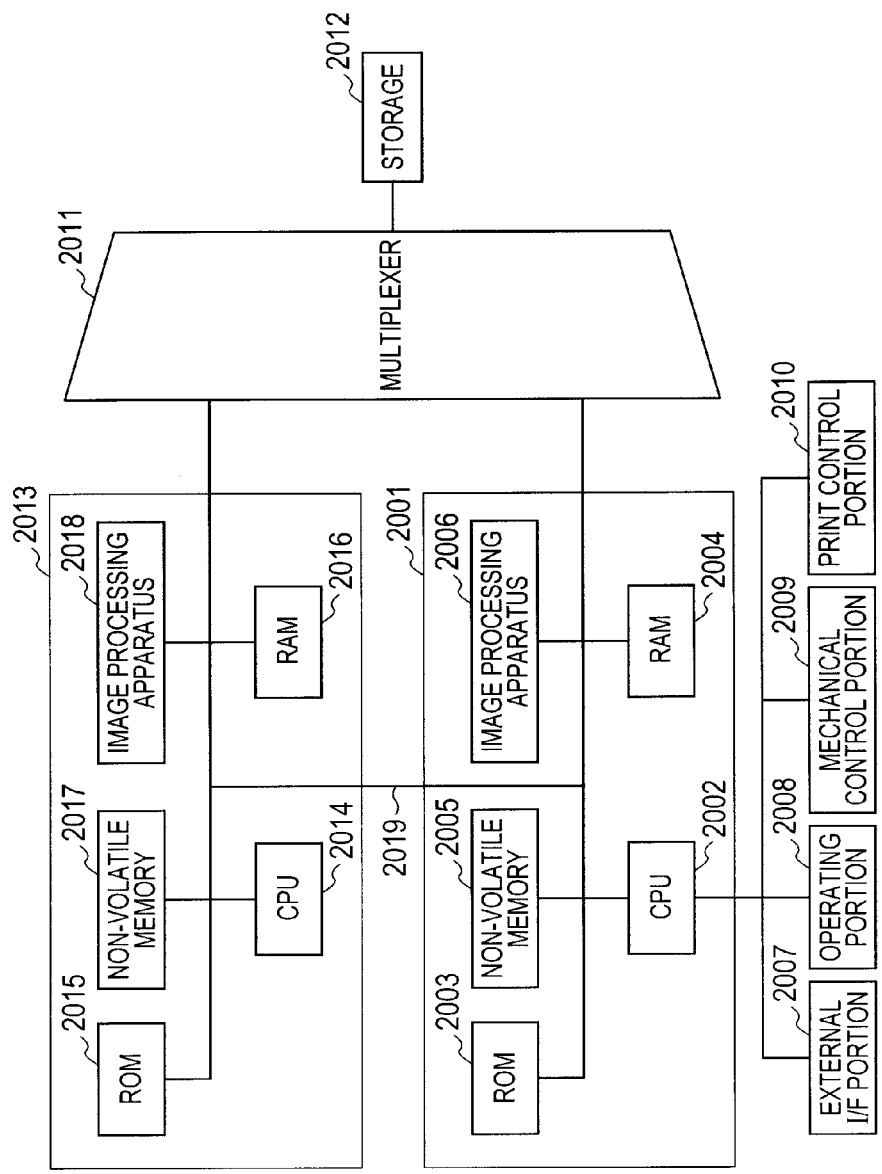
FIG. 2 is a block diagram illustrating the configuration of the image forming apparatus 1 of the present invention.

FIG. 2 is a block diagram illustrating the configuration of the image forming apparatus 1. The main body control portion 2001 controls a print function in the image forming apparatus 1. A CPU 2002 is a central arithmetic unit of the main body control portion 2001. The CPU 2002 executes a program read out from a ROM 2003.

A RAM 2004 independently secures a data memory region for respectively storing print job data received from the outside or image data received from the printer controller, and a work memory region for allowing the CPU 2002 of the main body control portion 2001 to execute a program. A non-volatile memory 2005 includes a Flash ROM or an EEPROM, and stores setting values such as the kind of print media currently set in the image forming apparatus 1 in a non-volatile manner independently of electric power supply. An image processing circuit 2006 of the main body control portion 2001 processes respective pixel data of the image data received from the printer controller 2013, and outputs a head data signal to be sent to the ink head. That is, the image processing circuit 2006 is a circuit for causing the printer to print an image on the basis of the image data received from the printer controller 2013.

The external I/F portion 2007 is an external interface, and is able to perform transmission and reception by a network connection protocol such as the IP protocol. The operating portion 2008 displays a message from CPU 2002 to a user using an LCD or LED, and inputs an instruction from the user using a key input device to the image forming apparatus 1. The mechanical control portion 2009 controls the rolled paper feeding unit 1005, or a cutter drive unit or paper ejection drive unit which are not illustrated, and performs transport control of the paper to be printed. The print control portion 2010 causes the printer to print an image. The printer is mounted with the ink head 1004, and has the rolled paper feeding unit 1005. The print control portion 2010 controls an ink supply unit, a carriage drive unit, and a head control unit, which are not illustrated, and makes ink be discharged from the ink head 1004. At this time, since the discharge of ink by the print control portion 2010 is synchronized with the mechanical control portion 2009, an image is printed on the paper fed by the control of the mechanical control portion 2009.

A multiplexer 2011 connects the main body control portion 2001 and the printer controller 2013 to the storage 2012. It is possible to access the multiplexer 2011 from both the main body control portion 2001 and the printer controller 2013 by a file system arranged logically at the storage 2012. Additionally, the multiplexer 2011 has a signal switching function or a signal selection function, and executes signal switching or signal selection not only in one direction but also both directions.

That is, the multiplexer 2011 is able to send the print job data stored in the main body control portion 2001 to the storage 2012, and send the print job data stored in the storage 2012 to the printer controller 2013.

The storage 2012 is formed by an HDD, and receives the data of the printer controller 2013 via the multiplexer 2011 to store the received data. Also, the data stored in the storage 2012 is read out by the main body control portion 2001 via the multiplexer 2011. Additionally, the storage receives the data of the main body control portion 2001 via the multiplexer 2011 to store the received data. Also, the data stored in the storage 2012 is read by the printer controller 2013 via the multiplexer 2011.

The printer controller 2013 has the function of performing rendering on the print job data that the image forming apparatus 1 has received via the external I/F and which is described in Page Description Language, thereby to create the image data to be printed.

The CPU 2014 is a central arithmetic unit of the printer controller 2013, and executes a program read out from a ROM 2015, thereby controlling the printer controller 2013. The RAM 2016 has a data memory region which stores the print job data received from the storage 2012 or the image data sent to the main body control portion 2001. Additionally, the RAM 2016 has a work memory region for allowing the CPU 2014 to execute the program and perform the rendering.

The non-volatile memory 2017 includes a Flash ROM or an EEPROM, and stores setting data, such as fonts, currently set in the printer controller 2013 in a non-volatile manner independently of electric power supply. The image processing circuit 2018 performs rendering of the print job data into image data.

A communication channel 2019 between processors is a communication channel between the main body control portion 2001 and the printer controller 2013, and is a path for instruction commands between the main body control portion 2001 and the printer controller 2013. Additionally, the communication channel 2019 between processors is also a path through which the image data subjected to rendering in the printer controller 2013 is transmitted to the main body control portion 2001. That is, the communication channel 2019 between processors is a path through which the processed image data that the printer controller 2013 is sent to the main body control portion 2001, and is a communication channel between the printer controller 2013 and the main body control portion 2001, which is different from a connection via the storage 2012. Moreover, communication of a command is made between the printer controller 2013 and the main body control portion 2001 via the communication channel 2019 between processors.

Next, a data flow in the image forming apparatus 1 will be described.

Figure 3:
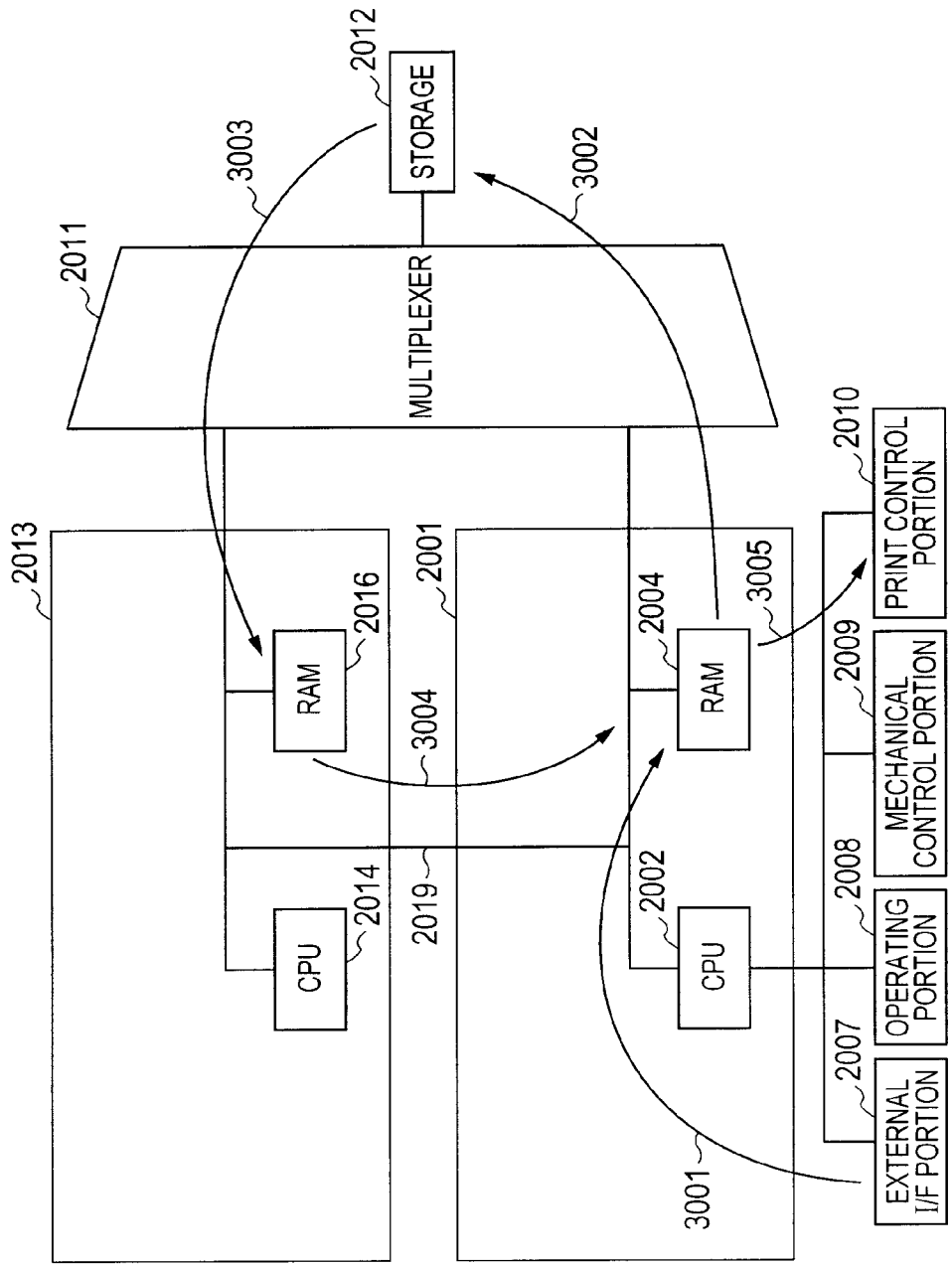
FIG. 3 is an explanatory view of a data flow in the image forming apparatus 1.

FIG. 3 is an explanatory view of the data flow in the image forming apparatus 1. The print job data input from the external I/F portion 2007 is written to the RAM 2004 of the main body control portion 2001 (path 3001). The written-in print job data is then stored in the file system of the storage 2012 via the multiplexer 2011 as a file for each page (path 3002).

The printer controller 2013 reads out the print job data divided for each page, which is stored in the file system of the storage 2012, via the multiplexer 2011. Then, the print job data is written to the RAM 2016 of the printer controller 2013 (path 3003). The printer controller 2013 performs rendering of the print job data in the RAM 2016 into image data. The image data subjected to rendering is transmitted to the RAM 2004 of the main body control portion 2001 via the communication channel 2019 between processors (path 3004). The main body control portion 2001 drives the print control portion 2010 and the mechanical control portion 2009, using the image data written in the RAM 2004, thereby executing printing (path 3005).

Since the main body control portion 2001 is connected to the external I/F portion 2007 in this way, the main body control portion 2001 receives print job data from an external host PC of the image forming apparatus 1 via the external I/F portion 2007. Then, the print job data that the main body control portion 2001 has received is stored in the storage 2012 via the multiplexer 2011. The printer controller 2013 is a circuit which reads out the print job data stored in the storage 2012, processes the print job data into image data capable of being processed by the main body control portion 2001, and transmits the image data to the main body control portion 2001. Also, the main body control portion 2001 is a circuit for causing the printer to print the image data received from the printer controller 2013.

In addition, in the example of FIG. 3, the image data subjected to rendering by the printer controller 2013 is transmitted to the main body control portion 2001 via the communication channel 2019 between processors. However, transmission of the image data is not limited thereto, and may be performed as the printer controller 2013 stores the image data subjected to rendering in the storage 2012 and the main body control portion 2001 reads out the image data stored in the storage 2012.

Next, data files of the storage 2012 will be described.

Figure 4:
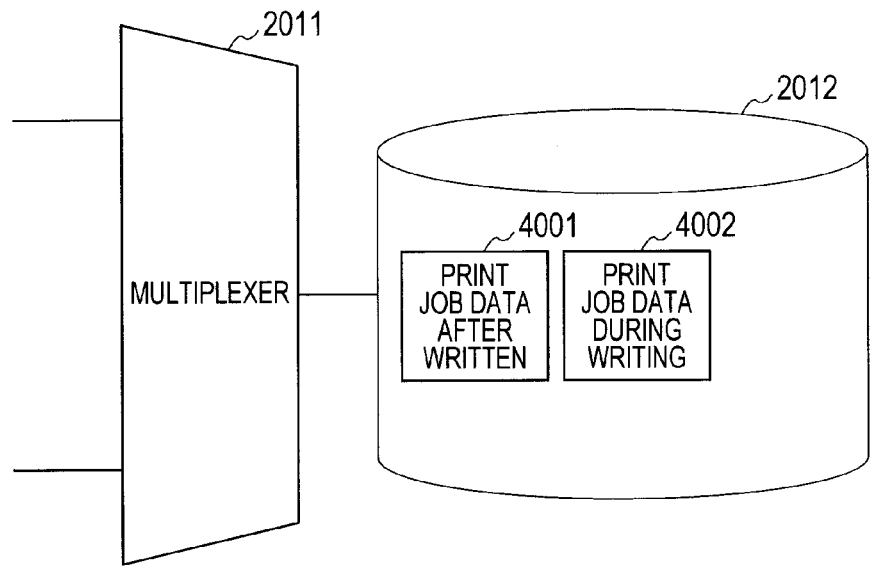
FIG. 4 is a view illustrating a file system in a storage 2012.

FIG. 4 is a view illustrating the file system in the storage 2012 of the image forming apparatus 1. In this case, the storage 2012 has a print job data file 4001 (equivalent to one page) after writing for one page, and a print job data file 4002 (equivalent to one page) of a page which is being written from the main body control portion 2001. In this way, in the storage 2012, the data capable of being rendered is divided for each page by managing the print job data as a file corresponding to each page. In addition, although a file is divided for each page here, two or more pages may be treated as one file, and may be managed according to the address of the turning point of a page within the file.

Next, the multiplexer 2011 in the image forming apparatus 1 will be described.

Figure 5:
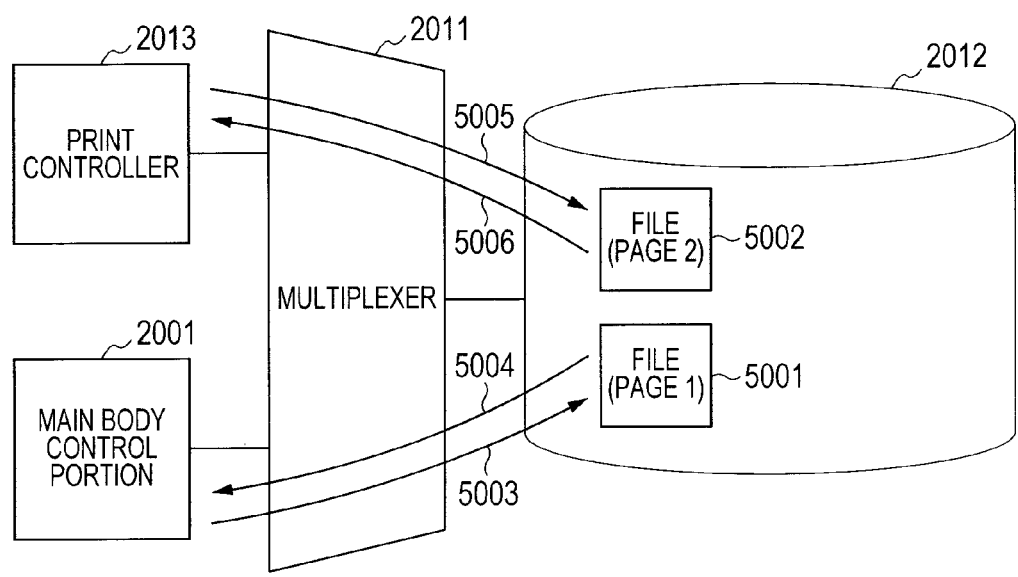
FIG. 5 is a view illustrating the storage 2012 and a multiplexer 2011.

FIG. 5 is a view illustrating the storage 2012 and the multiplexer 2011 in the image forming apparatus 1. The main body control portion 2001 and the printer controller 2013 are able to access the file of the storage 2012 for read and write thereof via the multiplexer 2011.

In the example illustrated in FIG. 5, a file 5001 and a file 5002 are equivalent to one page of print job data, respectively. A path 5003 is a write path to the file 5001 from the main body control portion 2001, and a path 5004 is a read-out path to the main body control portion 2001 from the file 5001.

Meanwhile, a path 5005 is a write path to the file 5002 from the printer controller 2013, and a path 5006 is a read-out path to the printer controller 2013 from the file 5002. As illustrated in FIG. 5, by using the multiplexer 2011 for connection to the storage, it is possible to access the files of the storage 2012 from both the printer controller 2013 and the main body control portion 2001.

Next, in the image forming apparatus 1, an image data band to be developed in the RAM 2016 of the printer controller 2013 and an image data band for printing to be developed in the RAM 2004 of the main body control portion 2001 will be described.

Figure 6:
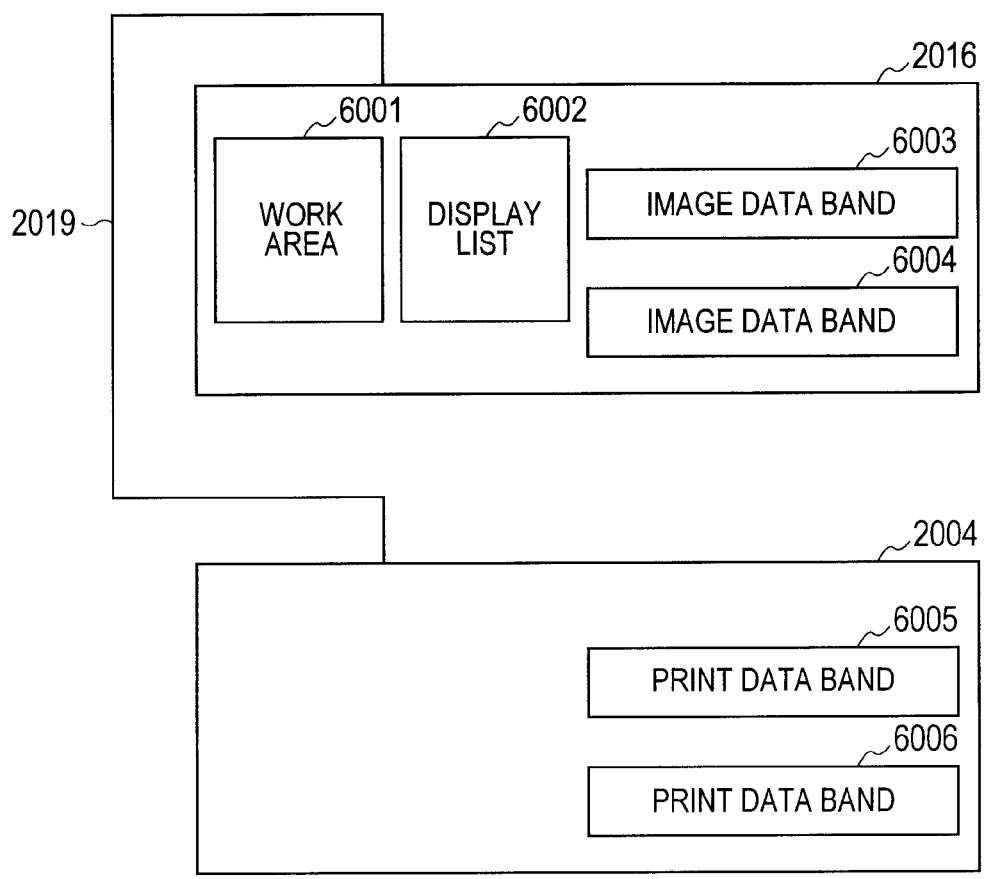
FIG. 6 is a view illustrating data on a RAM in the image forming apparatus 1.

FIG. 6 is a view illustrating data on the RAM in the image forming apparatus 1. In FIG. 6, the RAM 2016 on the side of the printer controller 2013 and the RAM 2004 on the side of the main body control portion 2001 are illustrated. A work area 6001 for analysis of print job data stores the print job data acquired from the storage 2012 via the multiplexer 2011 for data analysis. A display list 6002 is a display list formed by analyzing the print job data stored in the work area 6001 for analysis to be created.

Image data bands 6003 and 6004 are image data bands in which the image data subjected to rendering on the basis of the display list 6002 is stored. Also, a band within a specific page of the image data that the printer controller 2013 writes in the storage 2012 is different from a band within the specific page of the image data that the main body control portion 2001 reads out from the storage 2012. In addition, the above image data bands are those obtained by slicing and dividing data for one page horizontally. By managing the image data in units of the image data bands, it is possible to realize printing while saving memory even if image data for one page is of a large size.

Additionally, pages of image data may be assumed instead of the image data bands. In this case, the page of the image data that the printer controller 2013 writes in the storage 2012 is different from the page of the image data that the main body control portion 2001 reads out from the storage 2012.

In addition, although the image forming apparatus 1 constitutes a so-called double buffer using the two bands image data bands 6003 and 6004, image data bands which store image data of a third or fourth band, or higher may be provided if the memory capacity allows.

Image data bands 6005 and 6006 are image data bands for printing which are stored in the RAM 2004 on the side of the main body control portion 2001. The main body control portion 2001 sends the image data of the image data bands 6005 and 6006 for printing to the print control portion 2010, thereby executing printing. In addition, in the image forming apparatus 1, a so-called double buffer includes two bands of the image data bands 6005 and 6006 for printing. However, image data bands which store image data of a third or fourth band, or higher may be provided if the memory capacity allows.

The reason why the double buffer is used for the bands in the image forming apparatus 1 is to prevent a printing queue from being generated due to the fact that while one band is being printed, the next band cannot be transmitted. However, the present invention can be applied even in a case where a buffer corresponding to one band only is prepared.

Additionally, in the image forming apparatus 1, one band has the same size on the side of the image data bands 6003 and 6004 for rendering and on the side of the image data bands 6005 and 6006 for printing, but may have different sizes. Additionally, as long as the capacity of a memory is enough, one band may be made to have the same size as one page so as to constitute a page memory.

Next, the command communication between the processors in the image forming apparatus 1 will be described. This command communication is performed between the main body control portion 2001 and the printer controller 2013 via the communication channel 2019 between processors.

Figure 7:
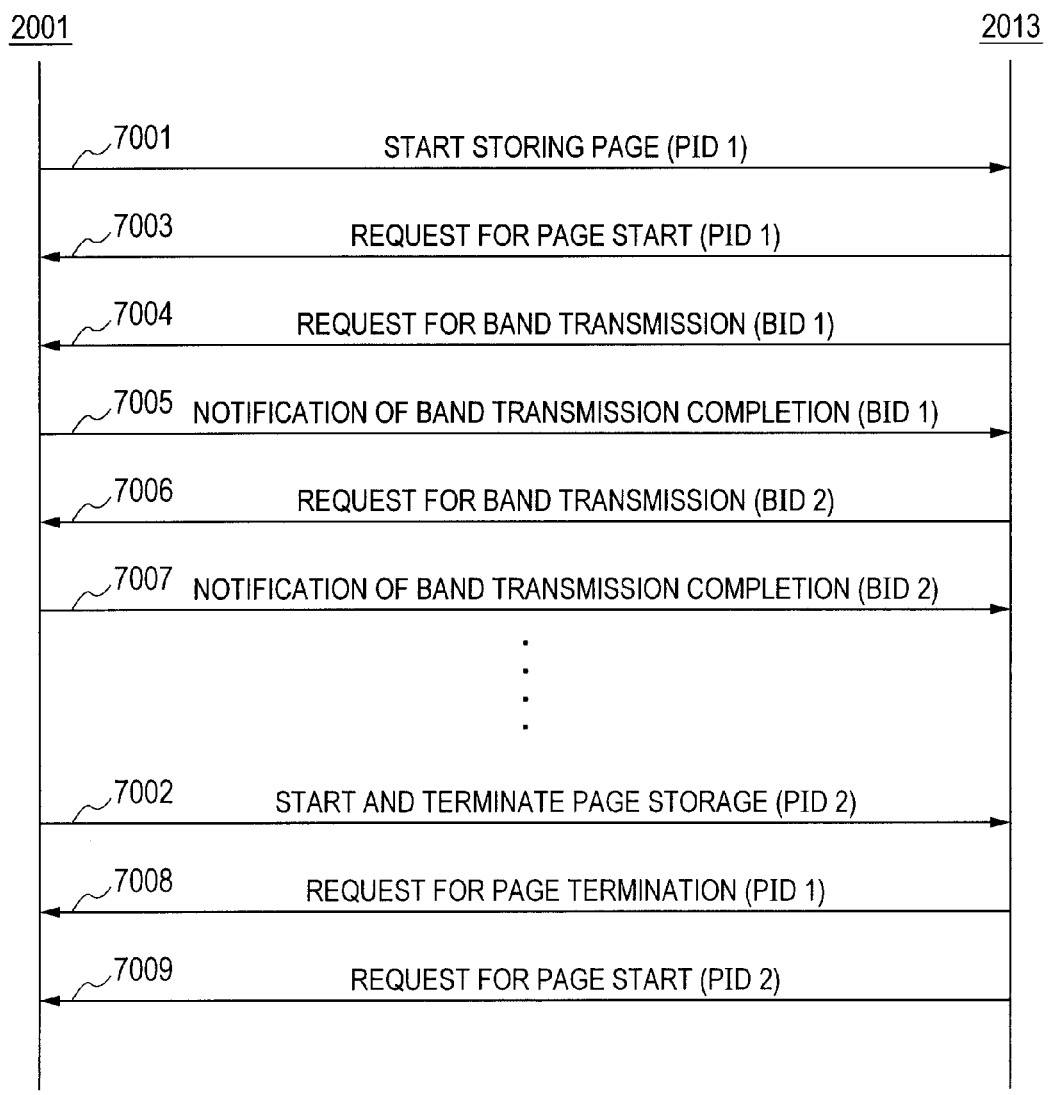
FIG. 7 is a view illustrating commands between processors in the image forming apparatus 1.

FIG. 7 is a view illustrating commands between processors in the image forming apparatus 1. The main body control portion 2001 sends a page storage start command 7001 to the printer controller 2013, and notifies the printer controller that storing of print job data of the page to the storage 2012 is started. A page storage start and page termination command 7002 makes storing of print job data of the next page to the storage 2012 start. Additionally, if there is no next page, the page storage start and page termination command 7002 is used in order to report termination of the page to the printer controller 2013. In addition, although the page storage start and page termination command 7002 is illustrated between a band transmission completion notification command 7007 and a page termination request command 7008 in FIG. 7, the page storage start and page termination command is not dependent on order, and is issued when storing of the print job data for one page, which is received from the external host PC to the storage 2012, is completed.

In addition, a page ID (PID) which specifies a page is allocated to the page storage start command 7001 or the page storage start and page termination command 7002. In the example illustrated in FIG. 7, 1 is allocated as a PID to the page storage start command 7001, and 2 is allocated as a PID to the page storage start and page termination command 7002.

The page start request command 7003 is sent to the main body control portion 2001 from the printer controller 2013, and notifies the main body control portion 2001 of a print start. A band transmission request command 7004 is sent to the main body control portion 2001 from the printer controller 2013, and notifies the main body control portion 2001 that transmission of image data for one band to the main body control portion 2001 has been allowed. In response to this notification, the image data for one band is transmitted to the main body control portion 2001 from the printer controller 2013. A band transmission completion notification command 7005 is sent to the printer controller 2013 from the main body control portion 2001, and notifies the printer controller 2013 that transmission of the image data of the band to the main body control portion 2001 has been completed. A band transmission request command 7006 is a band transmission request for the next band, and a band transmission completion notification command 7007 is a band transmission completion notification of the next band.

In FIG. 7, only two sets are illustrated as the set of the band transmission request and the band transmission completion notification. However, the band transmission request and the band transmission completion notification continue until transmission of the image data within a page terminates, though not shown.

A band ID (BID) which specifies a band is allocated to the band transmission request command 7004. In the example illustrated in FIG. 7, 1 is allocated as respective BIDs of the band transmission request command 7004 and the band transmission completion notification command 7005. 2 is allocated as respective BIDs of the band transmission request command 7006 and the band transmission completion notification command 7007.

A page termination request command 7008 is sent to the main body control portion 2001 from the printer controller 2013, and notifies the main body control portion 2001 that image data transmission of the page has been completed. A page start request command 7009 is a page start request for the next page.

1 is allocated as a PID to the page start request command 7003. 2 is allocated as the PID to the page start request command 7009. 1 is allocated as the PID of the page termination request command 7008.

Using the page IDs (PIDs) and the band IDs (BIDs), the printer controller 2013 and the main body control portion 2001 is able to be associated with the respective commands illustrated in FIG. 7 with pages as print targets.

Next, the rendering control operation of the image data for one page in the printer controller 2013 will be described.

Figure 8:
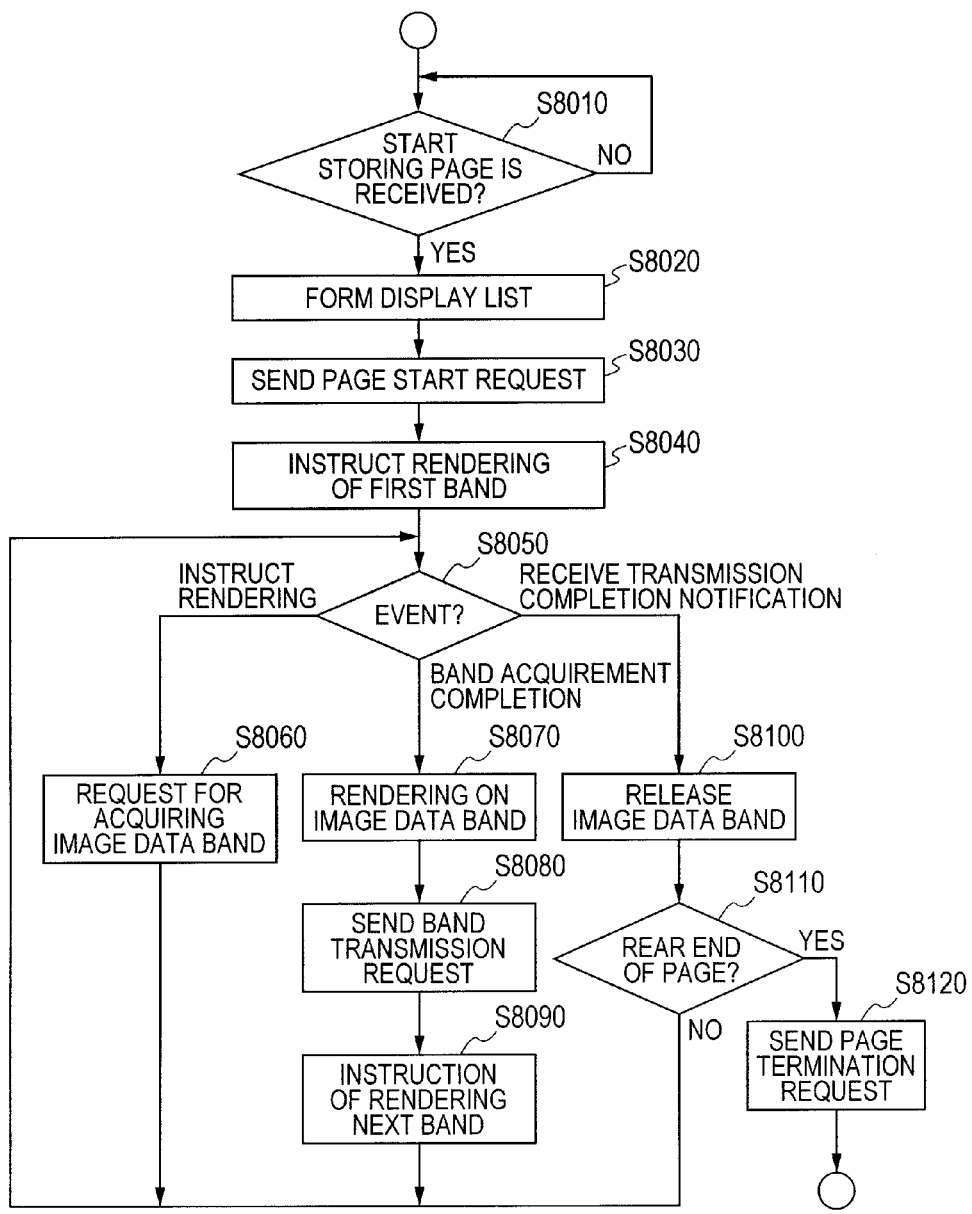
FIG. 8 is a flow chart illustrating the operation of a printer controller 2013.

FIG. 8 is a flow chart illustrating the operation of the printer controller 2013 in the image forming apparatus 1. In Step S8010, it is determined whether the page storage start command 7001 or 7002 has been received from the main body control portion 2001. If the page storage start command has been received, the processing proceeds to Step S8020, and if the page storage start command is not received, waiting lasts until the page storage start command is received. In Step S8020, creation of the display list 6002 is executed. If creation for one page of the display list 6002 is completed, the page storage start command 7003 is sent to the main body control portion 2001 in Step S8030.

In Step S8040, a rendering instruction of a first image data band is issued to the printer controller 2013 itself. Step S8050 is an event branch part where occurrence of various events within the printer controller 2013 is awaited, and if an event has occurred, various kinds of processing are executed. If a plurality of events occurs, it is possible to form a queue in order of occurrence.

If rendering instruction event occurs, the processing proceeds to Step S8060. In Step S8060, the fact that a region for the image data band 6003 or 6004 in the RAM 2016 has been acquired is issued to the printer controller 2013 itself, and the processing returns to an event branch step S8050. When a region for an image data band is acquired, an operating system which manages the memory of the printer controller 2013 is executed. If both of the image data bands 6003 and 6004 are used, any one of the bands is released. Thereafter, acquisition of the region for an image data band is carried out, and an event of acquisition completion is issued to the printer controller 2013 itself.

In Step S8050, if an acquisition completion event of an image data band occurs, rendering of the print job data stored in the storage 2012 is executed in Step S8070 on the basis of the display list 6002, and the processing proceeds to Step S8080. In Step S8080, an image data band transmission request is issued to the main body control portion 2001 from the printer controller 2013. Then, the image data of one band subjected to rendering in S8070 is transmitted to the main body control portion 2001. In Step S8090, a rendering instruction for the next image data band is issued to the printer controller 2013 itself, and the processing returns to Step S8050.

In S8080, if transmission of image data is completed after the image data band transmission request is sent, an image data band transmission completion notification is returned to the printer controller 2013 from the main body control portion 2001. Then, in Step S8050, an image data band transmission completion notification reception event occurs, and the processing proceeds to Step S8100. In Step S8100, the image data band sent to the main body control portion 2001 is released in the RAM 2016. In Step S8110, it is determined whether or not the last display list has been rendered on a page. If the display list is the last on the page, the processing proceeds to Step S8120, and if the display list is not the last on the page, the processing returns to Step S8050. In Step S8120, a page termination request is sent to the main body control portion 2001, and the processing exits the processing flow.

Next, the printing control of the image data for one page in the main body control portion 2001 will be described.

Figure 9:
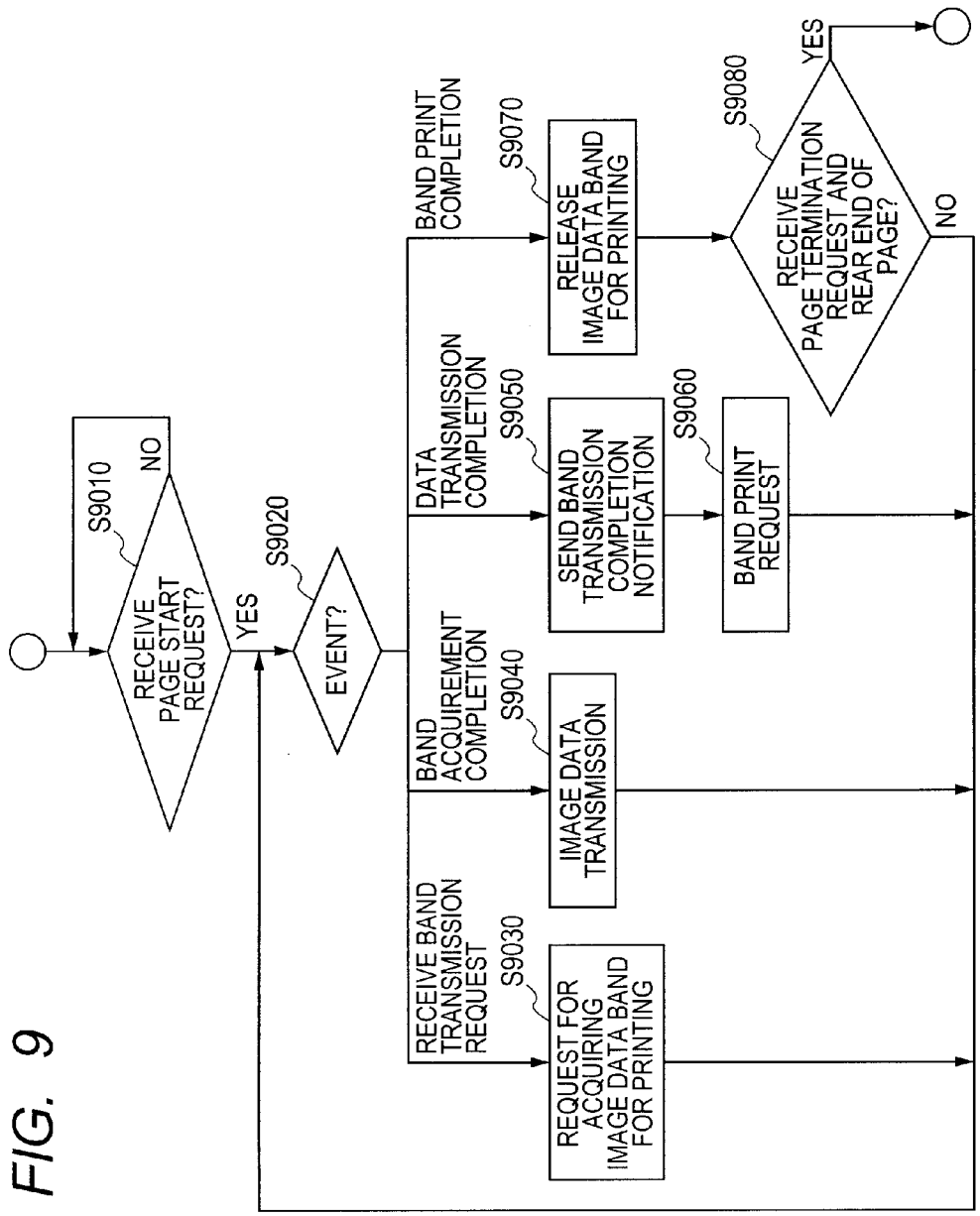
FIG. 9 is a flow chart illustrating printing of one page image data in a main body control portion 2001.

FIG. 9 is a flow chart illustrating the printing control of the image data for one page in the main body control portion 2001. In Step S9010, it is determined whether or not a page start request from the printer controller 2013 is received. If the page start request is received, the processing proceeds to Step S9020, and if the page start request is not received, the processing awaits until the page start request is received. Step S9020 is an event branch part where occurrence of various events within the main body control portion 2001 is awaited, and if an event has occurred, various kinds of processing are executed. If a plurality of events has occurred, it is possible to form a queue in order of occurrence.

If a band transmission request is received from the printer controller 2013, the processing proceeds to Step S9030. In Step S9030, in the RAM 2004, the notification that one region of any of the image data bands 6005 and 6006 for printing has been acquired is issued to the main body control portion 2001 itself, and the processing returns to Step S9020. When a region for an image data band in the RAM 2016 is acquired, an operating system which manages the memory of the main body control portion 2001 is executed. If both of the image data bands 6005 and 6006 for printing are used, one or the other of the bands is released. Thereafter, acquisition of an image data band for printing is carried out, and an event of acquisition completion of the image data band for printing is issued to the main body control portion 2001 itself.

If the event of acquisition completion of the image data band for printing occurs, in Step S9040, transmission of image data to the image data band for printing acquired in the RAM 2004 from the printer controller 2013 is started, and the processing returns to Step S9020.

After the transmission of the image data to the main body control portion 2001 from the printer controller 2013 is completed by one band, the main body control portion 2001 issues a band data transmission completion event to itself. If the band data transmission completion event occurs, the processing proceeds to Step S9050. In Step S9050, a band transmission completion notification is sent to the printer controller 2013. In Step S9060, printing control of the image data of the image data band for printing is instructed to the print control portion 2010, and the processing returns to Step S9020.

In the print control portion 2010, if the printing of the band is completed, the main body control portion 2001 issues a band printing completion event to itself. If the band printing completion event occurs, the processing proceeds to Step S9070 where the image data band for printing is released. It is determined in Step S9080 whether or not a page termination request has been received from the printer controller 2013, and printing of the image data band for printing has been completed in its entirety. If the page termination request 7008 is received, and whole printing of the image data band for printing is completed, the processing exits the processing flow. If not, the processing returns to Step S9020.

As described above, the image forming apparatus 1 is able to execute image formation in the data flow described in FIG. 3. Here, as compared to a case where the storage 2012 is connected only to the main body control portion 2001, in the image forming apparatus 1, the printer controller 2013 directly reads the print job data stored in the storage 2012 from the storage 2012. Therefore, it is possible to reduce the number of times of access to the RAM 2004 by the main body control portion 2001. Additionally, since it is not necessary to send print job data to the printer controller 2013 from the main body control portion 2001 via the communication channel between processors, it is also possible to reduce the number of routes of the communication channel between processors.

As described above, the image forming apparatus 1 combines the storage 2012 with both the printer controller 2013 and the main body control portion 2001 via the multiplexer 2011, and performs printing. That is, the storage 2012 is combined with both the printer controller 2013 and the main body control portion 2001, and the print job data stored in the storage 2012 are sent directly to the RAM 2016. For this reason, it is not necessary to relay the print job data stored in the storage 2012 to the RAM 2004. Accordingly, it is possible to reduce the number of times the main body control portion 2001 accesses the RAM 2004, thereby suppressing congestion of the memory bus, and it is possible to suppress congestion of the communication channel 2019 between processors.

Next, another example of the image forming apparatus in the present embodiment will be shown.

Figure 10:
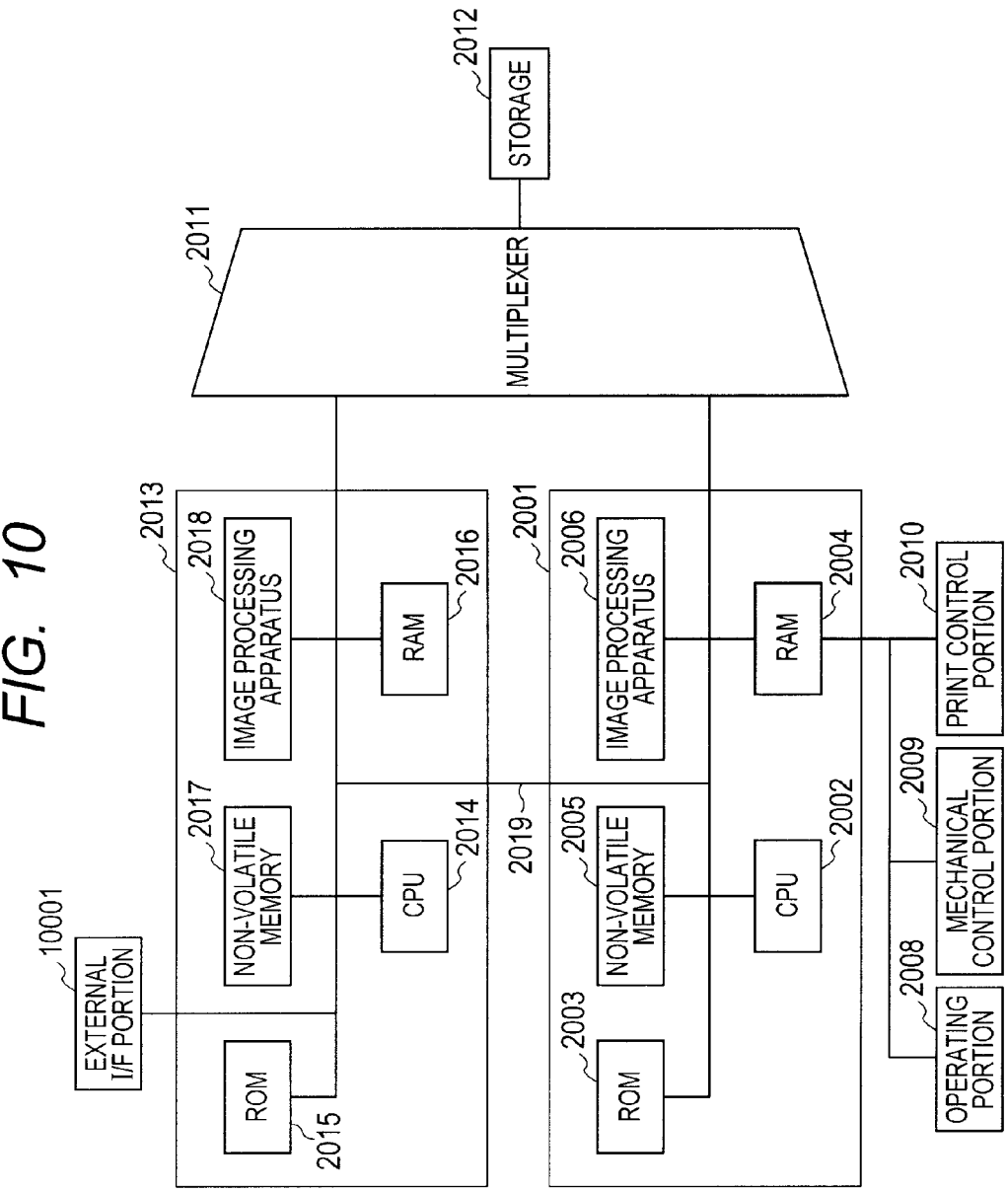
FIG. 10 is a block diagram illustrating an image forming apparatus 2.

FIG. 10 is a block diagram illustrating an image forming apparatus 2. Although the image forming apparatus 2 is basically the same as the image forming apparatus 1 illustrated in FIG. 1, in the image forming apparatus 1, an external I/F portion 10001 is provided instead of the external I/F portion 2007. That is, although the external I/F portion is provided at the main body control portion 2001 in the image forming apparatus 1, the external I/F portion is provided at the printer controller 2013 in the example of FIG. 2.

In addition, in the description of FIG. 2, the components similar to those in illustrated in FIG. 1 are designated by the same reference numerals, and the detailed description thereof is omitted. Additionally, in the configuration of a system in FIG. 2, description of the system components similar to the system components illustrated in FIG. 1 is omitted.

Although the external I/F portion 10001 has the same function as the external I/F portion 2007 illustrated in FIG. 1, this external IF portion is not connected to the main body control portion 2001, but is connected to the printer controller 2013. The communication channel 2019 between processors is provided between the main body control portion 2001 and the printer controller 2013, and is a path for instruction commands between both. However, the path in which the image data subjected to rendering in the printer controller 2013 is transmitted to the main body control portion 2001 via the storage 2012 as will be described later.

Next, a data flow in the image forming apparatus 2 will be described.

Figure 11:
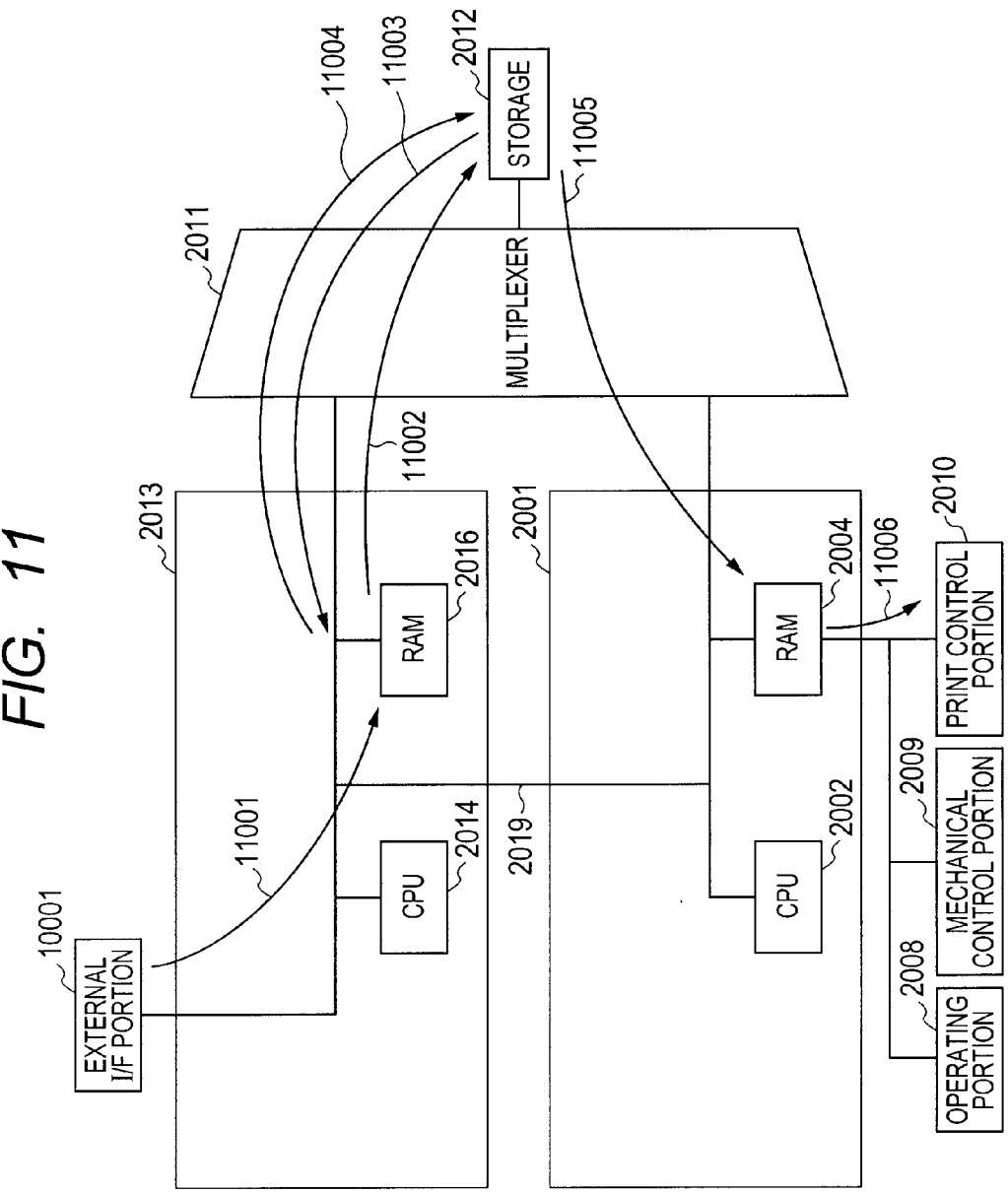
FIG. 11 is an explanatory view of a data flow in the image forming apparatus 2.

FIG. 11 is an explanatory view of the data flow in the image forming apparatus 2. The print job data input from the external I/F portion 10001 connected to the printer controller 2013 is written in the RAM 2016 of the printer controller 2013 (path 11001). The print job data which is written in the RAM 2016 is stored in the file system of the storage 2012 via the multiplexer 2011 as a file for each page (path 11002).

The printer controller 2013 reads out the print job data divided for each page, which is stored in the file system of the storage 2012, via the multiplexer 2011, and writes the print job data in the RAM 2016 of the printer controller 2013 (path 11003). The printer controller 2013 performs rendering of the print job data in the RAM 2016 into image data. The image data (rendered image data) subjected to rendering is stored in the storage 2012 via the multiplexer 2011 (path 11004).

The main body control portion 2001 reads out the rendered image data stored in the storage 2012 via the multiplexer 2011, and writes the rendered image data in the RAM 2004

(path 11005). The main body control portion 2001 drives the print control portion 2010 and the mechanical control portion 2009, using the image data written in the RAM 2004, thereby executing printing (path 11006).

The storage 2012 is able to read the data of the printer controller 2013 and write this data in the printer controller 2013, and is able to read the data of the main body control portion 2001 and to write this data in the main body control portion 2001.

The multiplexer 2011 sends the print job data stored in the printer controller 2013 to the storage 2012, and sends the print job data stored in the storage 2012 to the printer controller 2013. Additionally, the multiplexer 2011 sends the image data processed by the printer controller 2013 to the storage 2012, and sends the image data processed by the printer controller 2013, which is stored in the storage 2012, to the main body control portion 2001.

Since the printer controller 2013 is connected to the external I/F portion 10001 in this way, the printer controller receives print job data from an external host PC of the image forming apparatus 2 via the external I/F portion 10001. Then, the print job data that the printer controller 2013 has received is stored in the storage 2012. That is, the printer controller 2013 is a circuit which reads out the print job data stored in the storage 2012, processes the print job data into image data capable of being processed by the main body control portion 2001, and writes the image data in the storage 2012. Additionally, the main body control portion 2001 is a circuit which reads in the image data from the storage 2012 and prints the read image data.

Next, data files of the storage 2012 in the image forming apparatus 2 will be described.

Figure 12:
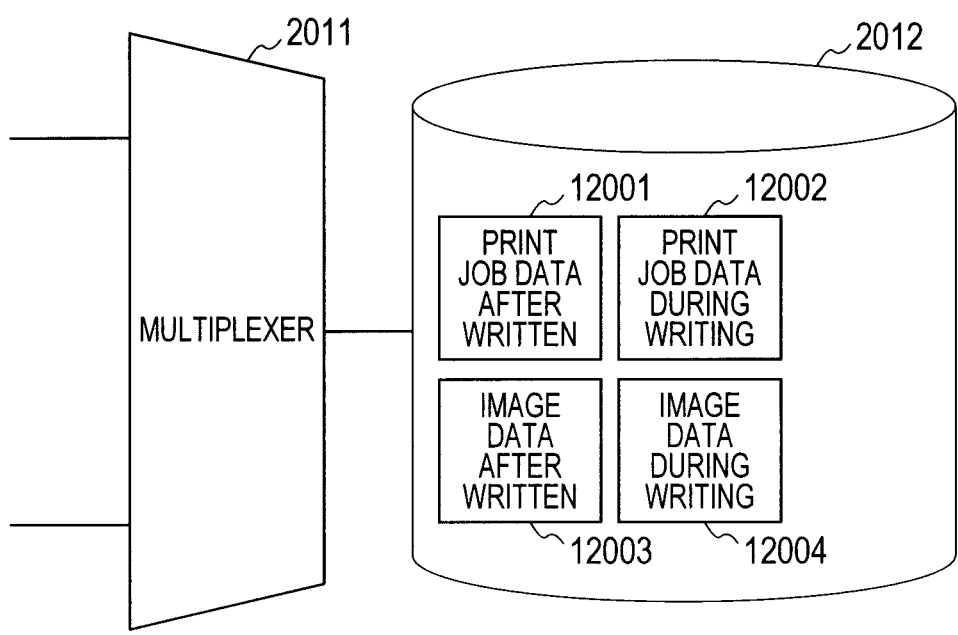
FIG. 12 is a view illustrating a file system in the storage 2012.

FIG. 12 is a view illustrating the file system of the storage 2012 in the image forming apparatus 2.

The one page print job data file (equivalent to one page) 12001 after writing and a print job data file (equivalent to one page) 12002 of a page during writing, which have been received from the printer controller 2013, is stored in the storage 2012 of the image forming apparatus 2. In the storage 2012, the data of pages capable of being rendered is divided for each page by managing the print job data as a file corresponding to each page.

In addition, although a file is divided for each page here, two or more pages may be treated as one file, and may be managed according to the address of the turning point of a page within the file.

An image data file 12003 after rendering for one page after writing and an image data file 12004 after rendering for one page during writing, which have been received from the printer controller 2013, are stored in the storage 2012 of the image forming apparatus 2. The image data of a target page with an image data band size is additionally written in the image data file 12003 after rendering, in order of rendering from the image data band 6003 or 6004 of the RAM 2016 of the printer controller 2013.

In addition, an image data band to be developed in the RAM 2016 of the printer controller 2013 and an image data band for printing to be developed in the RAM 2004 of the main body control portion 2001 are the same as the image data band and the image data band for printing which have been described with reference to FIG. 6. Accordingly, a detailed description thereof is omitted.

Next, the command communication between the processors in the image forming apparatus 2 will be described.

Figure 13:
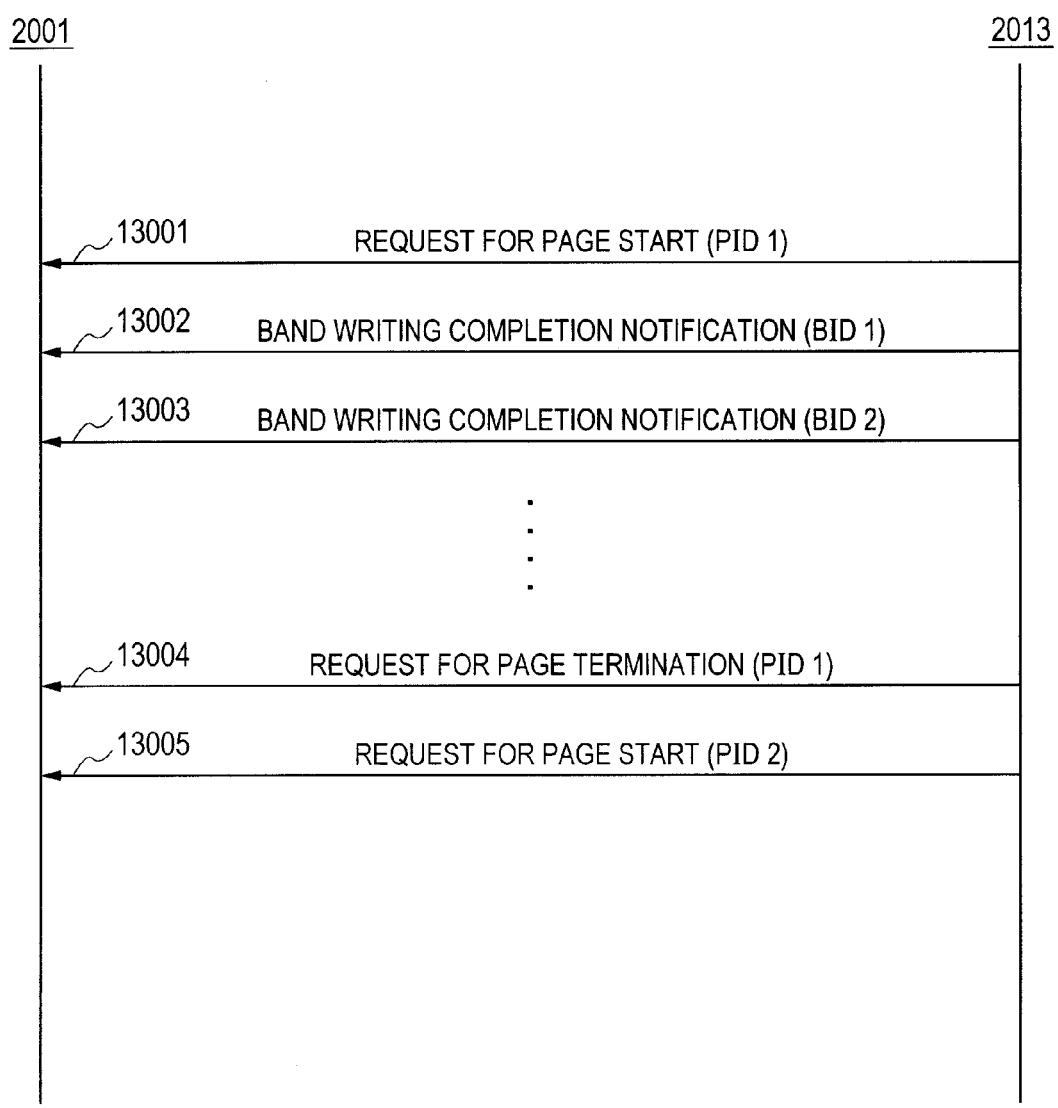
FIG. 13 is a view illustrating commands between processors in the image forming apparatus 2.

FIG. 13 is a view illustrating commands between processors in the image forming apparatus 2. The page start request command 13001 is sent to the main body control portion 2001 from the printer controller 2013, and notifies the main body control portion 2001 of a print start. A band writing completion notification command 13002 is sent to the main body control portion 2001 from the printer controller 2013, and notifies the main body control portion 2001 that read-out of the image data for one band from the storage 2012 has been allowed. The band writing completion notification command 13003 is a band writing completion notification of the band writing completion notification command 13002 to the next band.

Although two band writing completion notifications are illustrated in FIG. 13, band writing completion notifications which are not illustrated continue until writing of the image data within a page to the storage 2012 is terminated.

Band IDs (BIDs) which specify bands are respectively allocated to the band writing completion notification commands 13002 and 13003. In the example illustrated in FIG. 13, 1 is allocated as a BID to the band writing completion notification command 13002, and 2 is allocated as a BID to the band writing completion notification command 13003.

A page termination request command 13004 is sent to the main body control portion 2001 from the printer controller 2013, and notifies the main body control portion 2001 that writing of the image data within a page to the storage 2012 has been completed.

Page IDs (PIDs) which specify pages are respectively allocated to the page start request commands 13001 and 13005 and the page termination request command 13004. In the example illustrated in FIG. 13, 1 is allocated as a PID to the page start request 13001. 2 is allocated as a PID to the page start request command 13005. 1 is allocated as PID to the page termination request command 13004.

The page IDs (PIDs) and the band IDs (BIDs) are able to correlate the printer controller 2013 and the main body control portion 2001 with the respective commands illustrated in FIG. 13 and print target pages and corresponding image data files after rendering.

Next, the rendering control operation of the image data for one page in the printer controller 2013 will be described.

Figure 14:
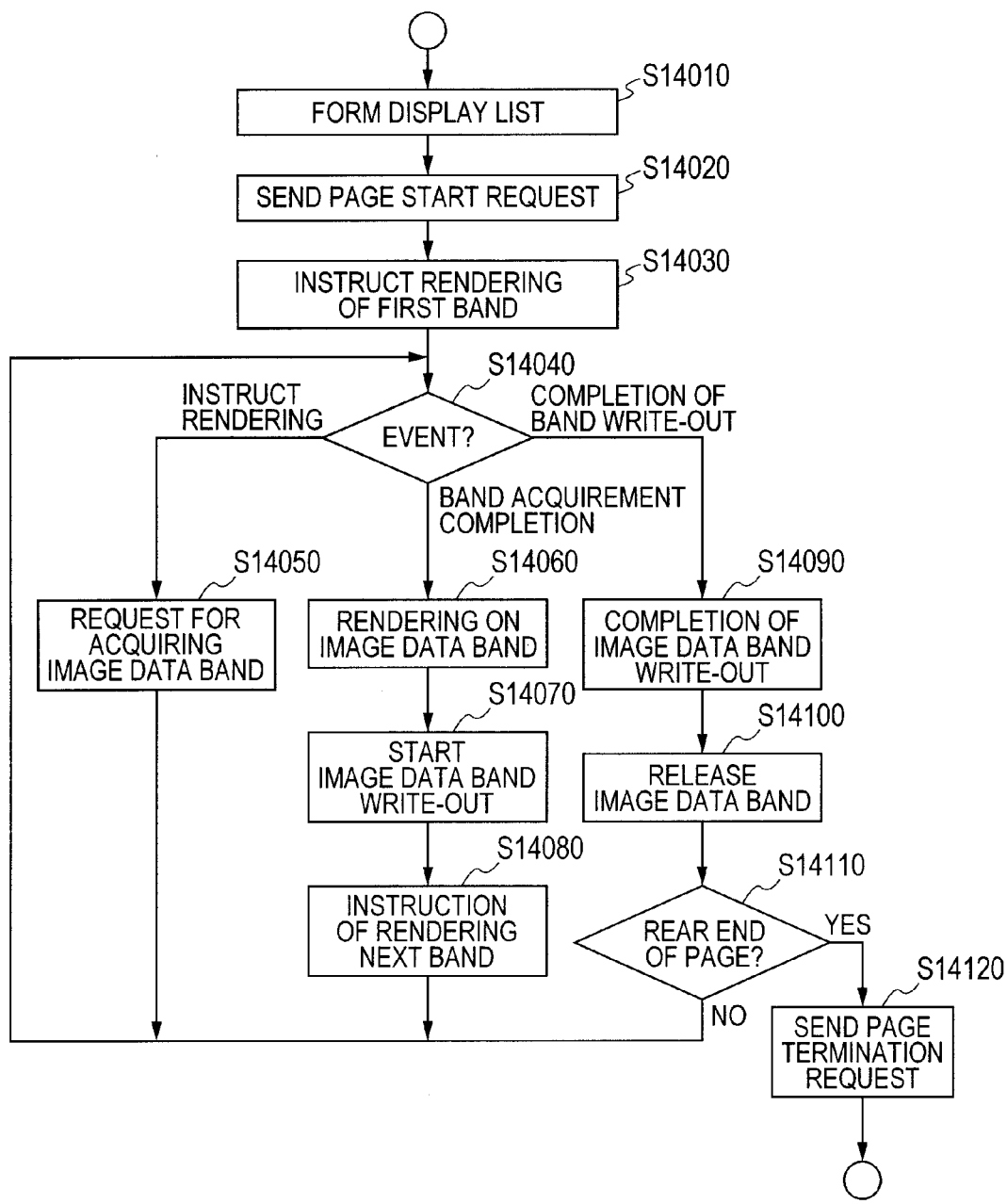
FIG. 14 is a flow chart illustrating the operation of the printer controller 2013.

FIG. 14 is a flow chart illustrating the operation of the printer controller 2013 in the image forming apparatus 2. In addition, since it is possible to carry out the operation of writing the print job data that the printer controller 2013 has received from the external I/F portion 10001 in the storage 2012 asynchronously with printing control, this operation is not illustrated in the flow chart of FIG. 14.

In Step S14010, the printer controller 2013 reads out the print job data file stored in the storage 2012 via the multiplexer 2011, writes and analyzes the print job data files in the work area 6001 for analysis of the RAM 2016, and forms the display list 6002. If creation for one page of the display list is completed, a page start request is sent to the main body control portion 2001 in Step S14020.

In Step S14030, a rendering instruction of a first image data band is issued to the printer controller 2013 itself. Step S14040 is an event branch part where occurrence of various events within the printer controller 2013 is awaited, and if an event has occurred, various kinds of processing are executed. If a plurality of events occurs, it is possible to form a queue in order of occurrence.

If a rendering instruction event occurs, in Step S14050, acquisition of a region for the image data band 6003 or 6004 in the RAM 2016 is issued to the printer controller 2013 itself, and the processing returns to an event branch step S14040. The operating system which manages the memory of the printer controller 2013 executes the operation of acquiring a region for an image data band. Then, if both of the image data bands 6003 and 6004 are used, one of either of the bands is released. Thereafter, an image data band is acquired, and an event of acquisition completion is issued to the printer controller 2013 itself.

In Step S14040, if an acquisition event of an image data band occurs, the processing proceeds to Step S14060. In Step S14060, rendering of the print job data stored in the storage 2012 is executed on the basis of the display list 6002, and the processing proceeds to Step S14070. In Step S14070, a write request of an image data band to the storage 2012 is issued to the printer controller 2013 itself. Then, the image data of one band subjected to rendering in S14060 is written in the storage 2012. In Step S14080, a rendering instruction for the next image data band is issued to the printer controller 2013 itself, and the processing returns to Step S14040.

In Step S14040, if the operating system of the printer controller 2013 generates the write completion notification of an image data band in the storage 2012, the processing proceeds to Step S14090. In Step S14090, a band writing completion notification is issued in the main body control portion 2001. In Step S14100, the image data band after writing to the storage 2012 is released. In Step S14110, it is determined whether or not the last display list of a page has been rendered. If the display list is the last of the page, the processing proceeds to Step S14120, and if the display list is not the last of the page, the processing returns to Step S14040. In Step S14120, a page termination request is sent to the main body control portion 2001, and the processing exits the processing flow.

Next, the printing control of the image data for one page in the main body control portion 2001 of the image forming apparatus 2 will be described.

Figure 15:
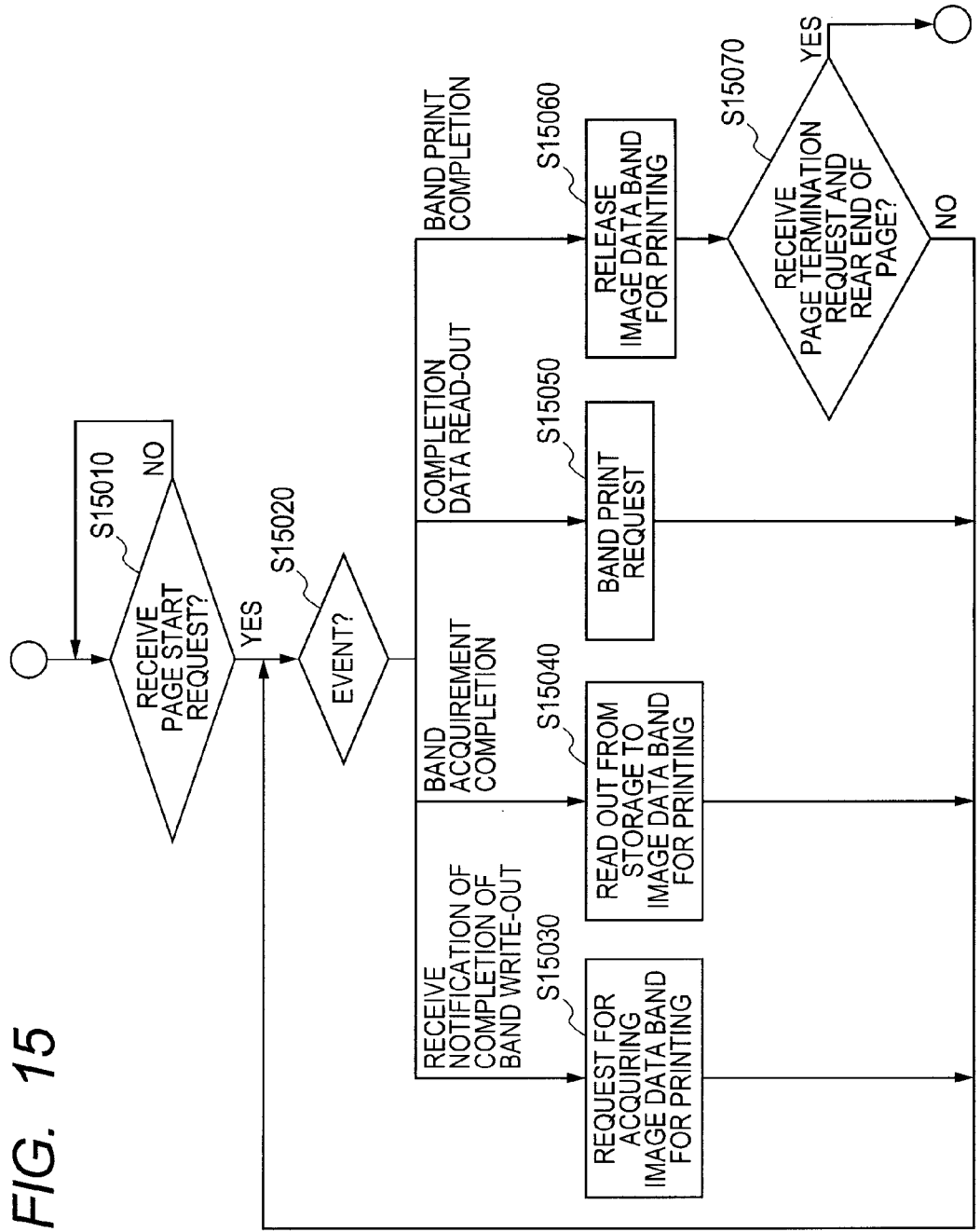
FIG. 15 is a flow chart of the operation of the main body control portion 2001 in the image forming apparatus 2.

FIG. 15 is a flow chart illustrating the operation of the main body control portion 2001 in the image forming apparatus 2. In Step S15010, it is determined whether or not a page start request from the printer controller 2013 is received. If the page start request is received, the processing proceeds to Step S15020, and if the page start request is not received, the processing waits until the page start request is received. Step S15020 is an event branch part where occurrence of various events within the main body control portion 2001 is awaited, and if an event has occurred, various kinds of processing are executed. If a plurality of events occurs, it is possible to form a queue in order of occurrence.

If the band write-out completion notification from the printer controller 2013 is received, the processing proceeds to Step S15030. In Step S15030, acquisition of the region for the image data band 6005 or 6006 for printing in the RAM 2004 is issued to the main body control portion 2001 itself, and the processing returns to Step S15020. When a region for an image data band is acquired, an operating system which manages the memory of the main body control portion 2001 is executed. If both of the image data bands 6005 and 6006 for printing are used, any one of the bands is released. Thereafter, acquisition of an image data band for printing is carried out, and an event of acquisition completion of the image data band for printing is issued to the main body control portion 2001 itself.

If the event of acquisition completion of the image data band for printing occurs, in Step S15040, transmission of image data to the acquired image data band for printing from the storage 2012 is started, and the processing returns to Step S15020.

If the image data for one band is transmitted to the image data band for printing from the storage 2012, the main body control portion 2001 issues a band data transmission completion event to itself, and if the band data transmission completion event occurs, the processing proceeds to Step S15050. In Step S15050, printing control of the image data of the image data band for printing is instructed to the print control portion 2010, and the processing returns to Step S15020.

In the print control portion 2010, if the printing of the band is completed, the main body control portion 2001 issues a band printing completion event to itself. If the band printing completion event occurs, the processing proceeds to Step S15060 where the image data band for printing is released. It is determined in Step S15070 whether or not a page termination request has been received from the printer controller 2013, and printing of the image data band for printing has been completed in its entirety. If the page termination request is received, and printing of the image data band for printing is completed in its entirety, the processing exits the processing flow. If not, the processing returns to Step S15020.

As described above, it is possible to execute image formation using the data flow described in FIG. 11. Here, as compared to a case where the storage 2012 is connected only to the printer controller 2013, in the image forming apparatus 2, the main body control portion 2001 reads directly the image data stored in the storage 2012 from the storage 2012. Therefore, it is possible to reduce the number of times the RAM 2016 is accessed by the main body control portion 2013.

That is, according to the image forming apparatus 2, the storage 2012 is combined with both the printer controller 2013 and the main body control portion 2001 via the multiplexer 2011, and printing is performed. Then, the rendered image data stored in the storage 2012 is sent directly to the RAM 2016. For this reason, it is not necessary to relay the rendered image data stored in the storage 2012 to the RAM 2016. Accordingly, it is possible to reduce the number of times the main body control portion 2001 accesses the RAM 2016, thereby suppressing congestion of the memory bus.

Other Embodiments

Aspects of the present invention can also be realized by a computer of a system or apparatus (or devices such as a CPU or MPU that reads out and executes a program recorded on a memory device to perform the functions of the above-described embodiment(s), and by a method the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium). While the present invention has been described with reference to exemplary embodiments, it is to be understood that the present invention is not limited to the disclosed exemplary embodiments. The scope of the next claims is to be accorded the broadest interpretation so as to encompass all such modifications and equivalent structures and functions.

Additionally, when the above program is executed, not only a case where processing is executed by one processor but a case where a plurality of processors executes the program in cooperation with each other, thereby performing processing, may be adopted.

While the present invention has been described with reference to exemplary embodiments, it is to be understood that the present invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-292669, filed Dec. 24, 2009, which is hereby incorporated by reference herein in its entirety.

What is claimed is:

1. An image forming apparatus comprising:
a printing unit which prints an image on a print medium;
a receiving unit which receives print job data from an external device connected to the image forming apparatus;
a first circuit which creates image data on the basis of the print job data received by the receiving unit;
a second circuit which causes the printing unit to print an image on the basis of the image data created by the first circuit and which is different from the first circuit; and
a storage accessible by the first circuit and the second circuit, respectively and individually, via a connection to the storage,
wherein the receiving unit inputs the print job data received from the external device to the second circuit,
wherein the second circuit stores the print job data input by the receiving unit in the storage, and notifies the first circuit of the storing of the print job data via a communication channel, the communication channel being between the first circuit and the second circuit and being different from the connection to the storage, and
wherein the first circuit, according to the notification by the second circuit, reads out the print job data stored in the storage from the storage via the connection to the storage and not via the second circuit, and creates image data on the basis of the read print job data.

2. The image forming apparatus according to claim 1, wherein the second circuit acquires the image data created by the first circuit, and causes the printing unit to print an image on the basis of the acquired image data.

3. The image forming apparatus according to claim 2, wherein the second circuit acquires the image data created by the first circuit via the communication channel.

4. The image forming apparatus according to claim 2, wherein the first circuit stores the image data created by the first circuit in the storage, and the second circuit reads out the image data stored in the storage from the storage, thereby acquiring the image data.

5. The image forming apparatus according to claim 1, wherein the second circuit notifies the first circuit of completion of storing of the print job data, and
wherein the first circuit and the second circuit perform communication of a command for determining the timing with which access to the storage is made via the communication channel, and access the storage according to the timing on the basis of the command.

6. The image forming apparatus according to claim 1, wherein the first circuit notifies the second circuit of start of storing of the print job data.

7. An image forming apparatus comprising:
a printing unit which prints an image on a print medium;
a receiving unit which receives print job data from an external device connected to the image forming apparatus;
a first circuit which creates image data on the basis of the print job data received by the receiving unit;
a second circuit which causes the printing unit to print an image on the basis of the image data created by the first circuit and which is different from the first circuit; and
a storage accessible by the first circuit and the second circuit, respectively and individually, via a connection to the storage,
wherein the receiving unit inputs the print job data received from the external device to the first circuit,
wherein the first circuit creates image data on the basis of the print job data input by the receiving unit, stores the created image data in the storage, and notifies the second circuit of the storing of the created image data via a communication channel, the communication channel being between the first circuit and the second circuit and being different from the connection to the storage, and
wherein the second circuit, according to the notification by the first circuit, reads out the image data stored in the storage from the storage via the connection to the storage and not via the first circuit, and causes the printing unit to print an image on the basis of the read image data.

8. The image forming apparatus according to claim 7, wherein the first circuit stores the print job data input by the receiving unit in the storage, reads out the print job data stored in the storage, and creates image data on the basis of the read print job data.

9. The image forming apparatus according to claim 7, wherein the second circuit notifies the first circuit of completion of storing of the created image data, and
wherein the first circuit and the second circuit perform communication of a command for determining the timing with which access to the storage is made via the communication channel, and access the storage according to the timing on the basis of the command.

10. The image forming apparatus according to claim 7, wherein the second circuit notifies the first circuit of start of storing of the created image data.

* * * * *